US005484039A

United States Patent [19]
Singleton et al.

[11] Patent Number: 5,484,039
[45] Date of Patent: Jan. 16, 1996

[54] FORCE REVERSING AND TRANSMITTING APPARATUS FOR A PARKING BRAKE SYSTEM

[75] Inventors: Robert W. Singleton, Geelong, Australia; Donald R. McCann, Farmington Hills, Mich.

[73] Assignee: Ford Motor Company, Bearborn, Mich.

[21] Appl. No.: 304,323

[22] Filed: Sep. 12, 1994

[51] Int. Cl.⁶ ........................................ B60T 1/00
[52] U.S. Cl. ................ 188/2 D; 74/535; 74/536
[58] Field of Search ................ 188/2 D, 106 A, 188/106 F, 325; 74/535, 536, 523, 501.6, 502.3, 502.6; 254/242, 247, 256

[56] References Cited

U.S. PATENT DOCUMENTS 3,335,621  8/1967  Buchwald .................................. 74/535
4,138,905  2/1979  Konishi .................................. 74/535 X
4,429,590  2/1984  Kopich ...................................... 74/535
4,643,043  2/1987  Furuta et al. ............................... 74/503
5,277,081  1/1994  Brown ....................................... 74/523

FOREIGN PATENT DOCUMENTS 2-020141  11/1983  Japan ....................................... 74/523

*Primary Examiner*—Robert J. Oberleitner
*Assistant Examiner*—Lee W. Young
*Attorney, Agent, or Firm*—Gregory P. Brown; Roger L. May

[57] ABSTRACT

A parking brake system for use in a motor vehicle, mounted on a floor member which operatively connects a hand-operated brake actuator to a wheel brake is disclosed. The parking brake system comprises a pulley for reversing the direction of a rearwardly directed tensile force output from the brake actuator and transmitting a forwardly directed tensile force to the wheel brakes. The system allows a hand operated parking brake actuator to be used in a vehicle with a cable linkage routed into the front of the vehicle rather than into the rear of the vehicle.

6 Claims, 3 Drawing Sheets he US Patent 5,484,039

FORCE REVERSING AND TRANSMITTING APPARATUS FOR A PARKING BRAKE SYSTEM

BACKGROUND OF THE INVENTION

1. Field of the Invention

This invention relates generally to a parking brake system for a motor vehicle. More specifically, the present invention relates to a force reversing and transmitting apparatus for use therein.

2. Disclosure Information

U.S. Pat. No. 4,212,211 discloses a conventional hand operated parking brake actuator. Typically, the actuator is mounted to a floor member within easy reach of the vehicle operator. The actuator transmits the operator's input force on the handle of the actuator to an output force at a cable attachment on the actuator, thus resulting in a tension force in a cable linkage. The cable linkage transmits the tension force to engage a set of rear wheel brakes. The cable linkage in a conventional parking brake actuator design runs directly rearward from the cable attachment at the actuator toward the wheel brakes.

In the design of some vehicles, such as an electrical vehicle, economical adaptation of a conventional parking brake actuator presents challenges previously not encountered because unique vehicle components prevent the usual routing of the brake cable. For an example, an electric vehicle carries a battery for a source of energy. The size, shape and mass of the monolithic battery requires a structurally unencroached mounting location within the vehicle structure. Typically, the most feasible location for the battery is under the cargo floor, immediately rearward of the operator seating area. This conflicts with use of a conventional hand operated parking brake actuator, since the conventional actuator requires routing the cable linkage directly to the rear of the brake actuator and therefore, the cable linkage would encroach the battery package space.

It would be desirable to provide an apparatus that would allow the use of a conventional parking brake actuator in battery powered electric vehicles.

SUMMARY OF THE INVENTION

According to the present invention, a parking brake apparatus is disclosed for use in a motor vehicle, the apparatus being mounted on a floor member of the vehicle, to operatively connect a hand-operated brake actuator to a right rear wheel brake and a left rear wheel brake. The parking brake apparatus comprises an equalizer and cable means operatively connecting the brake actuator to the right and left rear wheel brakes. The cable means further comprises a first cable operatively interconnecting the right rear wheel brake to the equalizer and a second cable operatively interconnecting the left rear wheel brake to the equalizer and a third cable interconnecting the equalizer to the brake actuator. The parking brake apparatus further comprises bracket means for mounting the brake actuator to the floor member. The parking brake apparatus further comprises a pulley disposed on the bracket means, said pulley being adapted for reversing the direction of a rearwardly directed tensile force output from the brake actuator and transmitting a forwardly directed tensile force to the wheel brakes.

One advantage the present invention provides is the use of a conventional parking brake actuator in a vehicle in which the cable means must project forwardly from the brake actuator location to avoid interference with the battery. These and other objects and advantages of the present invention will become apparent from the drawings, description and claims which follow.

DETAILED DESCRIPTION OF THE PREFERRED EMBODIMENTS

Figure 1:
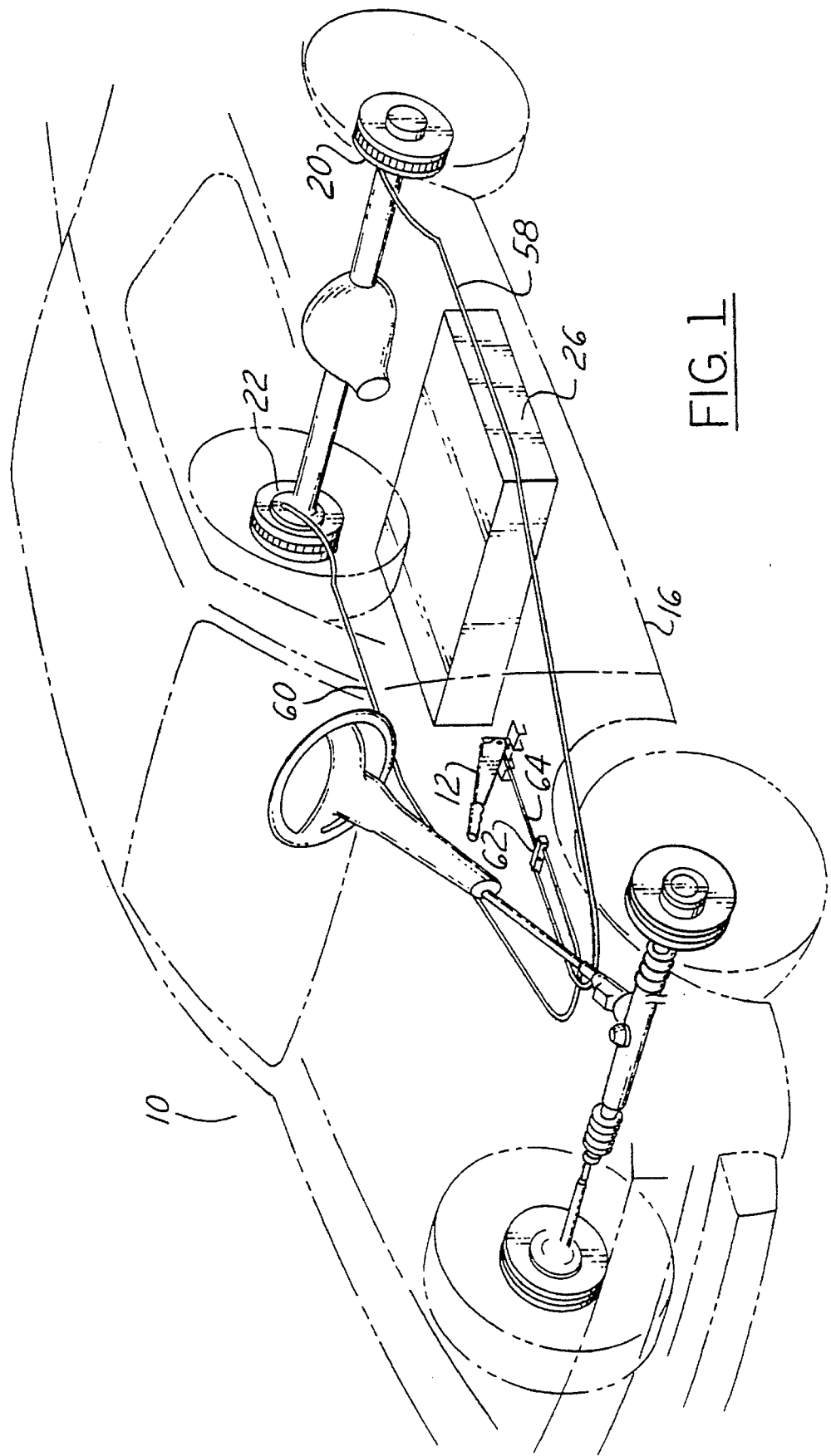
FIG. 1 is a perspective view of a motor vehicle having a parking brake apparatus according to the present invention.

Referring now to the figures, FIG. 1 illustrates a motor vehicle 10 having a parking brake apparatus according to the present invention. A hand operated brake actuator 12 is supported on a floor member of the motor vehicle body structure 16. The brake actuator 12 operatively connects left 20 and right 22 rear wheel brakes by a cable assembly. A battery 26 mounts to the underside of the body structure 16 between the brake actuator 12 and the left 20 and right 22 rear wheel brakes.

Figure 2:
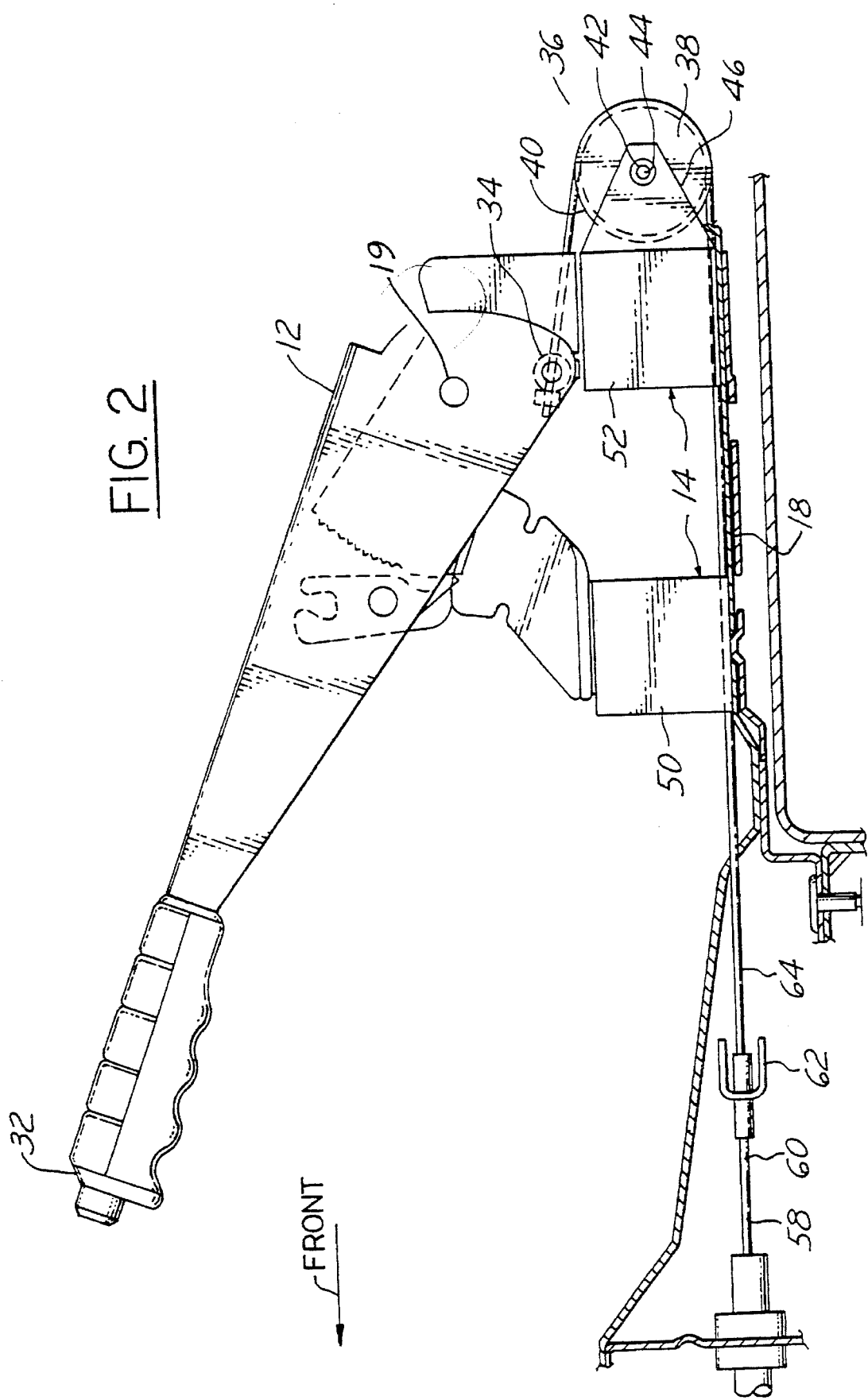
FIG. 2 is an elevational view of a parking brake apparatus according to the present invention.

FIG. 2 illustrates the parking brake apparatus of the present invention with the brake actuator 12 elevated a predetermined distance above the floor member 18 by bracket assembly 14. The brake actuator 12 pivots about a pivot pin 19 and functions as a first class lever that translates an input force exerted by the operator on an actuator handle 32 to an output force at a cable attachment 34. It should be readily apparent to one skilled in the art that many types of brake actuators exist having the same operability and utility.

Figure 3:
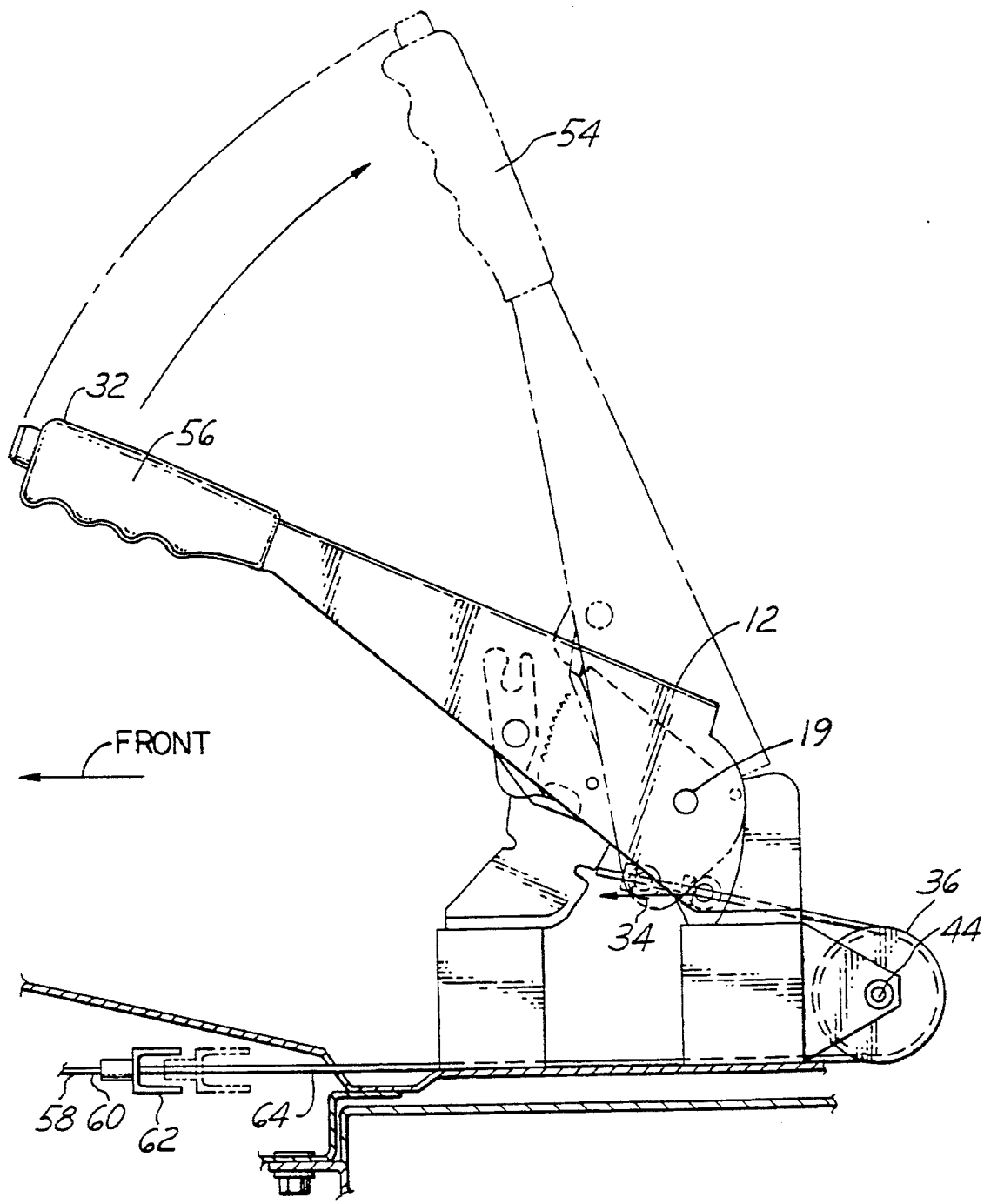
FIG. 3 is an elevational view of a parking brake apparatus in a brake-released and brake-applied position according to the present invention.

As is further shown in FIGS. 2 and 3, the parking brake apparatus includes a pulley 36 having a circular planar member 38 having a circumferential channel 40 extending around the outer periphery of the planar member 38. The pulley 36 has an aperture 42 that receives an axle 44 which rotatably supports the pulley 36 on the bracket assembly 14. The axle 44 may comprise, but is not limited to, a pinned joint or a threaded rod fastener.

The bracket assembly 14 includes first 50 and second 52 bracket portions mounted to the floor member 18 to elevate and support the brake actuator 12. Additionally, the second bracket portion 52 includes a cantilever 46 for supporting the axle 44 and the pulley 36 allowing the pulley 36 to rotate freely relative to the second bracket portion 52. The height of the bracket assembly 14 provides the clearance for pulley 36 rotations from a brake-applied position 54 to a brake-released position 56. It should be readily apparent to those skilled in the art that various designs would serve the purposes of the bracket means stated herein. For example, the design could include, but is not limited to, having the brake actuator 12 mounted directly to the floor member 18 with the pulley 36 being disposed beneath the floor member 18.

Referring back to FIGS. 1 and 2, cable assembly connects the brake actuator 12 with the wheel brakes 20, 22. The cable assembly includes first 58 and second 60 cables extending forward from the respective wheel brake along the outboard sides of the body structure 16. At a predetermined point forward of the front edge of the battery 26, the cables 58 and 60 bend laterally inboard and extend rearward to connect to an equalizer 62 at a point forward of the brake actuator 12. The first and second cables 58, 60 are preferably of bowdin design cable, however the present invention is not so limited. Any cable design may be substituted that would equivalently transfer the force to the wheel brakes 20, 22. A third cable 64 attaches to the equalizer 62 and extends rearward to the pulley 36 where the third cable 64 bends forwardly to attach to the brake actuator 12 at the cable attachment 34.

In operation and as shown in FIG. 3, the vehicle operator engages the parking brake by raising the actuator handle 32 of the brake actuator 12 from the released position 56 to the applied position 54, which ultimately creates a predetermined tension force in the cable assembly. As the actuator handle 32 is rotated upward by the operator, the output force at the cable attachment 34 acting on the third cable 64 is directed toward the front of the motor vehicle 10, as in a conventional hand brake actuator. The pulley 36 redirects this force by rotating on the axle 44. The resulting force applied to the first and second cables 58, 60 at the equalizer 62 is directed rearward, in the opposite direction as applied. The first and second cables 58, 60 directly transmit the resultant tension force to the respective left 20 and right 22 wheel brakes.

The foregoing description presents one embodiment of the present invention. Details of construction have been shown and described for purposes of illustration rather than limitation. Modifications and alterations of the invention may occur to those skilled in the art. It is the following claims, including all equivalents, which define the scope of my invention.

What is claimed is:

1. A parking brake apparatus for use in a motor vehicle having a pivotable manual brake actuator for generating a rearwardly directed output force and a right rear wheel brake and a left rear wheel brake, said parking brake apparatus comprising:
   an equalizer;
   cable means operatively connecting said brake actuator to said wheel brakes wherein said cable means comprises:
      a first cable operatively interconnecting said right rear wheel brake to said equalizer;
      a second cable operatively interconnecting said left rear wheel brake to said equalizer;
      a third cable interconnecting said equalizer to said brake actuator;
   a first bracket portion for mounting said brake actuator a predetermined distance above a floor member;
      a second bracket portion for mounting said brake actuator to said floor member a predetermined distance above said floor member and forming a rearwardly extending cantilever arm; and
   a pulley disposed on said cantilever arm, said pulley being adapted for reversing the direction of the rearwardly directed tensile force from the brake actuator and transmitting a forwardly directed tensile force to said wheel brakes.

2. A parking brake system according to claim 1, wherein said pulley further comprises:
   a circular planar member having a circumferential channel extending around the outer periphery of said planar member;
   an aperture passing through said planar member; and
   an axle passing through said aperture for rotatably supporting said planar member from said cantilever arm.

3. A parking brake system according to claim 2, wherein said pulley is angularly displaceable from a brake-released position to a brake-applied position.

4. A parking brake system according to claim 1 wherein said first and second cables extend forward from said wheel brakes along respective outboard edges of said vehicle to a predetermined location, thereupon bending laterally inboard and extending rearward to connect to said equalizer, said third cable extending therefrom rearward to said pulley, said pulley thereby directing said third cable forwardly to attach to said brake actuator.

5. A parking brake apparatus for use in a motor vehicle having a hand-operated brake actuator for generating a rearwardly directed output force and a right rear wheel brake and a left rear wheel brake, said parking brake apparatus comprising:
   an equalizer;
   a first cable extending forward from said right rear wheel brake along an outboard edge of said vehicle to a predetermined location, thereupon bending laterally inboard and extending rearward to interconnect said right rear wheel brake to said equalizer;
   a second cable extending forward from said left rear wheel brake along an outboard edge of said vehicle to a predetermined location, thereupon bending laterally inboard and extending rearward to interconnect said right rear wheel brake to said equalizer;
   a third cable interconnecting said equalizer to said brake actuator;
   a cable fastener for fastening said third cable to a lower end of said brake actuator;
   a first bracket portion for mounting said brake actuator a predetermined distance above a floor member;
   a second brackets portion for mounting said brake actuator to said floor member a predetermined distance above said floor member and forming a rearwardly extending cantilever arm;
   a pulley disposed on said cantilever arm, said pulley being adapted for reversing the direction of the rearwardly directed tensile force output from the brake actuator and transmitting a forwardly directed tensile force to the wheel brakes, said pulley further comprising:
      a circular planar member having a circumferential channel extending around the outer periphery of said planar member;
      an aperture passing through said planar member; and
      an axle passing through said aperture for rotatably supporting said planar member from said bracket means.

6. A parking brake system according to claim 5, wherein said pulley is angularly displaceable from a brake released position to a brake-applied position.

* * * * *